(12) United States Patent
Ohashi

(10) Patent No.: US 12,491,435 B2
(45) Date of Patent: Dec. 9, 2025

(54) RENDERING AN AVATAR WITH VIRTUAL ACCESSORIES

(71) Applicant: SONY INTERACTIVE ENTERTAINMENT INC., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 251 days.

(21) Appl. No.: 18/030,861

(22) PCT Filed: Nov. 12, 2021

(86) PCT No.: PCT/JP2021/041667
§ 371 (c)(1),
(2) Date: Apr. 7, 2023

(87) PCT Pub. No.: WO2022/107688
PCT Pub. Date: May 27, 2022

(65) Prior Publication Data
US 2023/0415040 A1  Dec. 28, 2023

(30) Foreign Application Priority Data
Nov. 19, 2020 (JP) .................. 2020-192711

(51) Int. Cl.
*G06T 13/40* (2011.01)
*A63F 13/52* (2014.01)
(Continued)

(52) U.S. Cl.
CPC .............. *A63F 13/53* (2014.09); *A63F 13/52* (2014.09); *A63F 13/65* (2014.09); *G06F 3/011* (2013.01);
(Continued)

(58) Field of Classification Search
CPC ....... G06T 19/006; G06T 19/20; G06T 11/60; G06T 13/40; G06T 17/20;
(Continued)

(56) References Cited

U.S. PATENT DOCUMENTS

2014/0168217 A1* 6/2014 Kim .................. G06Q 30/0643
345/420
2022/0309567 A1* 9/2022 Han ........................ G06T 19/20

FOREIGN PATENT DOCUMENTS

JP  2009134681 A  6/2009
JP  2012253483 A  12/2012
(Continued)

OTHER PUBLICATIONS

International Search Report and Written Opinion mailed Dec. 14, 2021, from PCT/JP2021/041667, 10 sheets.

*Primary Examiner* — Lawrence S Galka
(74) *Attorney, Agent, or Firm* — Kilpatrick Townsend & Stockton LLP

(57) ABSTRACT

An image generation apparatus 100 according to the present disclosure includes a player recognition section 102 configured to recognize a body of a player, a viewpoint acquisition section 103 configured to acquire viewpoint information including a viewpoint position and a viewpoint direction, a mesh generation section 105 configured to generate a mesh structure of the player that reflects a skeleton of the body of the player, on the basis of a result of the recognition, and an image generation section 110 configured to generate an image by rendering the mesh structure of the player and a virtual object when viewed in the viewpoint direction from the viewpoint position in the viewpoint information, and superimposing the rendered virtual object on the rendered mesh structure of the player.

10 Claims, 13 Drawing Sheets

(51) Int. Cl.

| | | |
|---|---|---|
| *A63F 13/53* | (2014.01) | |
| *A63F 13/65* | (2014.01) | |
| *G06F 3/01* | (2006.01) | |
| *G06T 7/70* | (2017.01) | |
| *G06T 15/20* | (2011.01) | |
| *G06T 15/40* | (2011.01) | |
| *G06T 15/50* | (2011.01) | |
| *G06T 17/20* | (2006.01) | |
| *G06T 19/00* | (2011.01) | |
| *G06V 40/10* | (2022.01) | |

(52) U.S. Cl.
CPC ............. *G06T 7/70* (2017.01); *G06T 15/20* (2013.01); *G06T 15/40* (2013.01); *G06T 15/50* (2013.01); *G06T 17/20* (2013.01); *G06V 40/10* (2022.01); *G06T 2207/30201* (2013.01)

(58) Field of Classification Search
CPC ........... A63B 2071/0636; A63F 13/213; A63F 13/2145; A63F 13/428; A63F 13/655; G06V 20/20; G06V 40/10; G06V 40/103; G06V 40/23; G06V 40/28; G09G 2340/10; G09G 2340/12
See application file for complete search history.

(56) References Cited

FOREIGN PATENT DOCUMENTS

| | | |
|---|---|---|
| JP | 2013101468 A | 5/2013 |
| JP | 2013101528 A | 5/2013 |
| JP | 2020160645 A | 10/2020 |
| WO | 2019112738 A1 | 6/2019 |

* cited by examiner

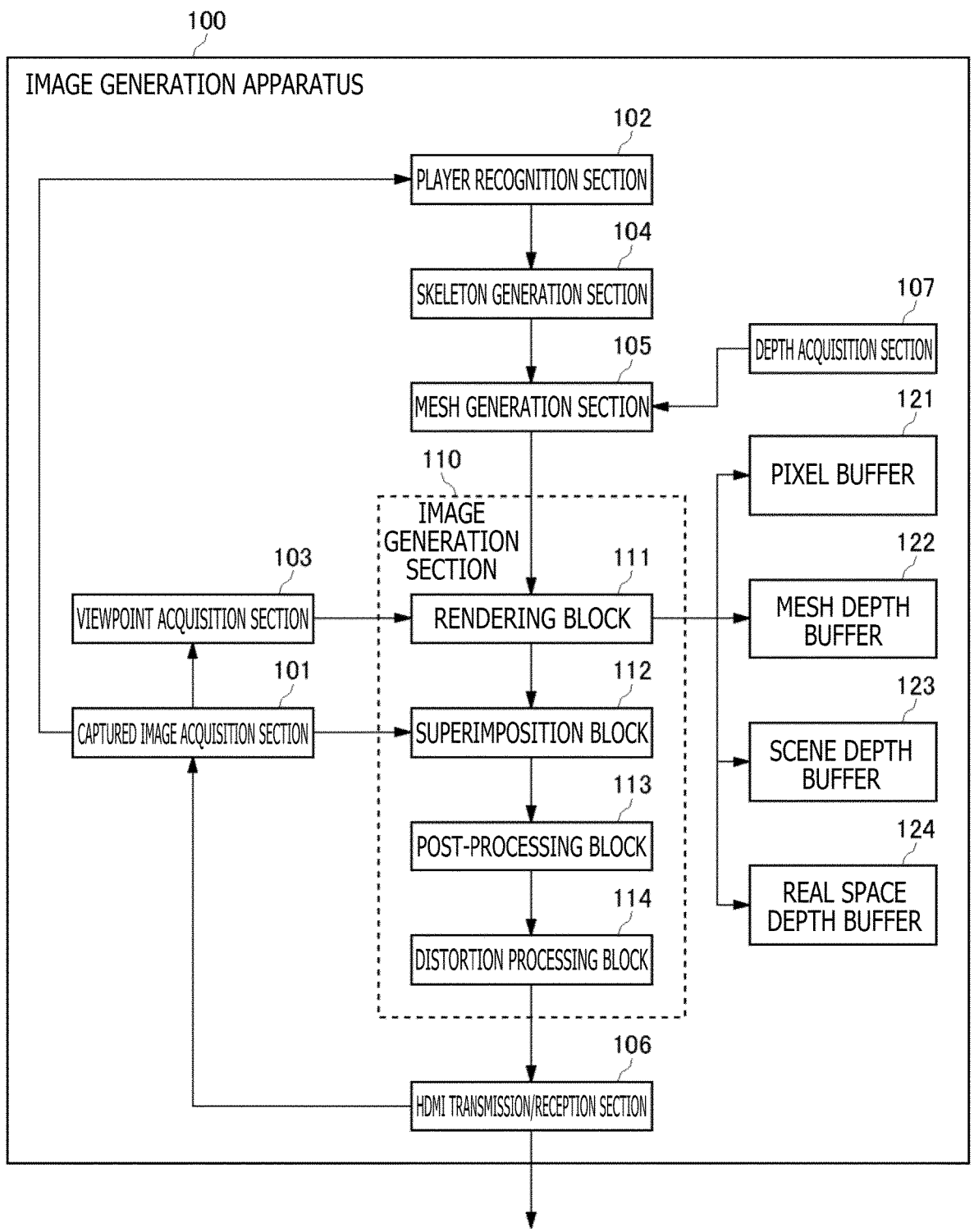

RENDERING AN AVATAR WITH VIRTUAL ACCESSORIES

TECHNICAL FIELD

The present disclosure relates to an image generation apparatus, an image generation method, and a program.

BACKGROUND ART

In playing a game, a user wears a head-mounted display (HMD) connected to a game machine on the head and operates a controller or the like while viewing a screen displayed on the HMD. Wearing the HMD provides effects of increasing a sense of immersion in a video world and further enhancing the entertainment of the game, since the user views nothing other than the video displayed on the HMD. Further, causing the HMD to display a virtual reality (VR) video and display, when the user wearing the HMD turns the head, a 360-degree view of an entire circumferential virtual space further increases a sense of immersion in the video and improves the operability of an application such as a game.

Further, there is an HMD of a video-transmissive (video see-through) type that can shoot a video of the outside world by using a camera mounted in the HMD and display the video on a display panel. The HMD of the video-transmissive type can also generate and display an augmented reality (AR) video by superimposing a virtual world object generated by using computer graphics (CG) on the video of the outside world shot by the camera. An augmented reality video is different from a virtual reality which is disconnected from the real world, in that the augmented reality video is augmentation of the real world with a virtual object and enables the user to experience the virtual world while being aware of a connection with the real world.

SUMMARY

Technical Problems

In the case where an image in which a virtual object is superimposed on an image of a player playing a game is displayed, the virtual object that is supposed to be on the far side sometimes overwrites a part of the body of the player that is supposed to be on the near side. Hence, there are cases where depth is not represented accurately. As a result, a sense of unity between the body of the player and the virtual object cannot be obtained, resulting in an unnatural image.

In view of the problems described above, one of objects of the present disclosure is to provide an image generation apparatus, an image generation method, and a program that can provide an image in which the depth is more accurately represented with regard to a body of a player and a virtual object superimposed on the body of the player.

Solution to Problems

In order to solve the problems described above, an image generation apparatus according to an aspect of the present disclosure includes a player recognition section configured to recognize a body of a player, a viewpoint acquisition section configured to acquire viewpoint information including a viewpoint position and a viewpoint direction, a mesh generation section configured to generate a mesh structure of the player that reflects a skeleton of the body of the player, on the basis of a result of the recognition, and an image generation section configured to generate an image by rendering the mesh structure of the player and a virtual object when viewed in the viewpoint direction from the viewpoint position in the viewpoint information, and superimposing the rendered virtual object on the rendered mesh structure of the player.

An image generation method according to another aspect of the present disclosure includes a step of recognizing a body of a player, a step of acquiring viewpoint information regarding a viewpoint position and a viewpoint direction, a step of generating a mesh structure of the player that reflects a skeleton of the body of the player, on the basis of a result of the recognition, and a step of generating an image by rendering the mesh structure of the player and a virtual object when viewed in the viewpoint direction from the viewpoint position in the viewpoint information, and superimposing the rendered virtual object on the rendered mesh structure of the player.

A program according to still another aspect of the present disclosure is a program for causing a computer to execute a step of recognizing a body of a player, a step of acquiring viewpoint information regarding a viewpoint position and a viewpoint direction, a step of generating a mesh structure of the player that reflects a skeleton of the body of the player, on the basis of a result of the recognition, and a step of generating an image by rendering the mesh structure of the player and a virtual object when viewed in the viewpoint direction from the viewpoint position in the viewpoint information, and superimposing the rendered virtual object on the rendered mesh structure of the player.

It is noted that any combinations of the constituent components described above and conversions of the representations of the present disclosure between a method, an apparatus, a system, a computer program, a data structure, a recording medium, and the like are also effective as modes of the present disclosure.

Advantageous Effects of Invention

According to the present disclosure, it is possible to provide an image in which the depth is more accurately represented with regard to a body of a player and a virtual object superimposed on the body of the player.

BRIEF DESCRIPTION OF DRAWINGS

FIG. 9 is a configuration diagram of the image generation apparatus according to a second embodiment.

DESCRIPTION OF EMBODIMENTS

First Embodiment

Figure 1:
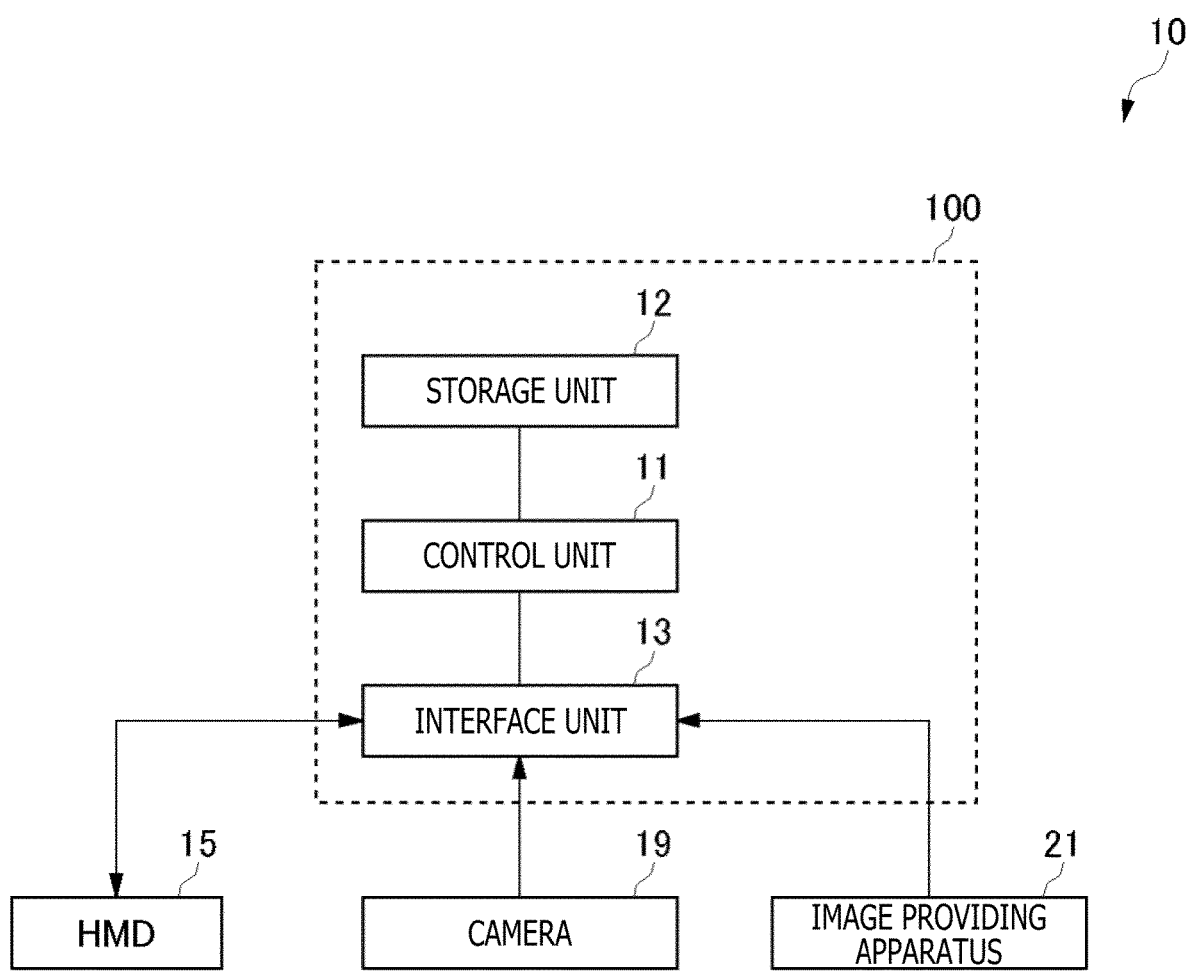
FIG. 1 is an overall schematic diagram of an image generation system according to a first embodiment.

FIG. 1 is an overall schematic diagram of an image generation system according to a first embodiment. An image generation system 10 of FIG. 1 includes an image generation apparatus 100. An example of the image generation apparatus 100 includes a game machine. The image generation apparatus 100 is connected to an HMD 15, a camera 19, and an image providing apparatus 21. The number of HMDs 15 connected to the image generation apparatus 100 is not limited to the example of FIG. 1.

The image generation apparatus 100 includes a control unit 11, a storage unit 12, and an interface unit 13. The control unit 11 includes a processor and executes programs stored in the storage unit 12, to perform various types of information processing. The storage unit 12 includes a memory device such as a random-access memory (RAM) and stores programs executed by the control unit 11 and data processed by the programs.

The interface unit 13 is an interface for data communication between the HMD 15, the camera 19, and the image providing apparatus 21. The image generation apparatus 100 is connected to the HMD 15, the camera 19, and the image providing apparatus 21 in a wired or wireless manner via the interface unit 13. Specifically, the interface unit 13 includes a multimedia interface such as a high-definition multimedia interface (HDMI) (registered trademark) which is a communication interface standard for transmitting videos and audio as digital signals.

The HMD 15 is a viewing apparatus that is worn on the head of a user and allows the user to view still images, moving images, and the like displayed on a display and to listen to audio, music, and the like output from headphones. The HMD 15 includes a gyro sensor and an acceleration sensor. The HMD 15 uses these sensors to measure the position information regarding the head of the user wearing the HMD 15 and the rotation angle, tilt, and the like of the head. A camera unit (not illustrated) is mounted on the HMD 15. By use of the camera unit, the HMD 15 can capture an image of the outside world from the viewpoint of the user while the user wears the HMD 15. The HMD 15 supplies the captured image to the image generation apparatus 100. The HMD 15 displays an image generated by the image generation apparatus 100 on the basis of the captured image on the display.

The camera 19 is installed such that the camera 19 can capture an image of a game player and objects such as a floor and a wall that are present around the game player. The camera 19 supplies the captured image of a real space to the image generation apparatus 100.

The image providing apparatus 21 is configured to be able to receive the generated image from the image generation apparatus 100 and provide the received image to the user. The image providing apparatus 21 is configured to be able to display the image received from the image generation apparatus 100. Further, the image providing apparatus 21 is configured to be able to upload the received image as a content file to a video distribution server (not illustrated).

The image generation apparatus 100 may be connected to an input unit (not illustrated) in which the user inputs operation information. The image generation apparatus 100 may include a communication interface for performing data communication with the outside via a communication network.

Figure 2:
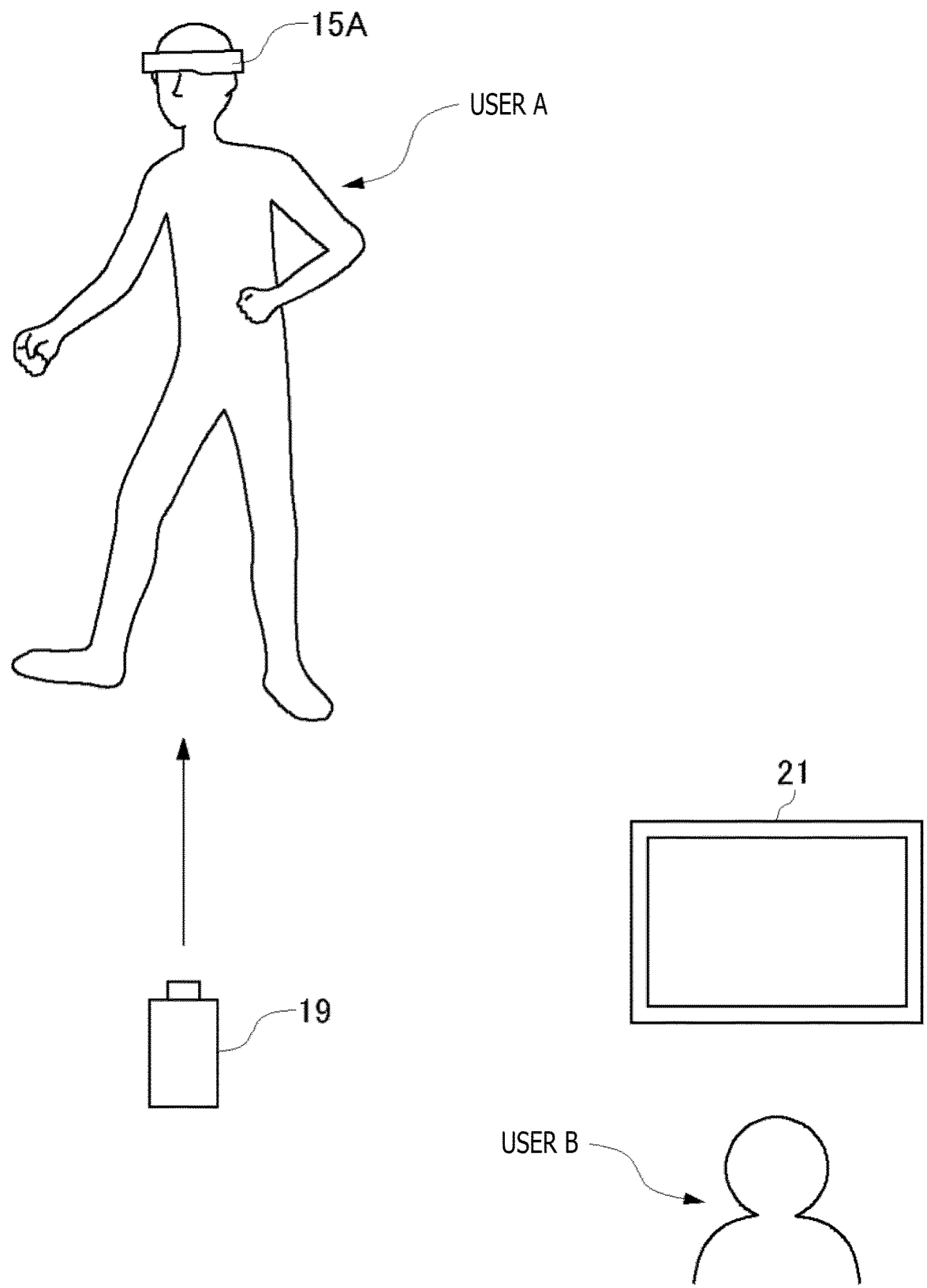
FIG. 2 is a diagram illustrating an example of how the embodiment is used by users.

FIG. 2 illustrates an example of how the present embodiment is used by users. In the example of FIG. 2, a user A is a player playing a game and wearing the HMD 15. In the example of FIG. 2, a user B is a spectator who watches the play of the user A in the game and who is viewing a play image of the user A being displayed by the image providing apparatus 21. Further, in the example of FIG. 2, the camera 19 is arranged to capture an image of the user A from the front of the user A. However, the camera arrangement is not limited thereto, and the camera 19 may be arranged to capture an image of the user A from any position such as right beside, right behind, or diagonally to the side of the user A. As described later, in the present embodiment, it is possible to more accurately represent occlusion between the body of a player and a virtual object. Hence, for example, as illustrated in FIG. 2, the present embodiment is suitable for the case where the spectator watches the game play of the player from a third-person viewpoint different from a viewpoint of the player. Additionally, the present embodiment is also suitable for the case where the game player captures an image of his/her own game play by using the camera 19 with the third-person viewpoint and distributes the game play to other users via the image providing apparatus 21.

Figure 3:
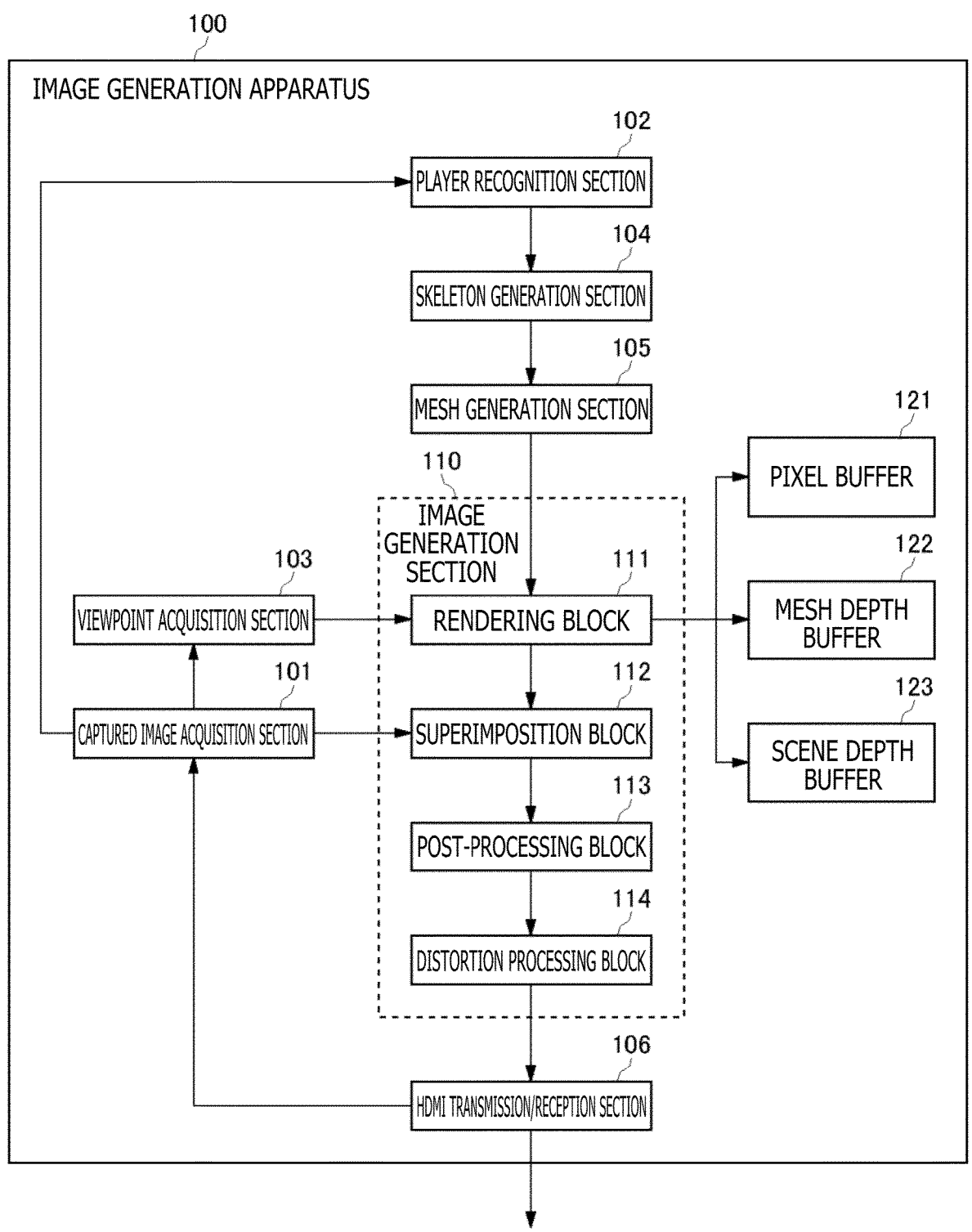
FIG. 3 is a configuration diagram of an image generation apparatus according to the first embodiment.

FIG. 3 is a configuration diagram of the image generation apparatus according to the present embodiment. The image generation apparatus 100 includes a player recognition section 102, a captured image acquisition section 101, a viewpoint acquisition section 103, a skeleton generation section 104, a mesh generation section 105, an image generation section 110, and an HDMI transmission/reception section 106. The image generation section 110 includes a rendering block 111, a superimposition block 112, a post-processing block 113, and a distortion processing block 114. FIG. 3 illustrates a block diagram focusing on functions, and these functional blocks can be realized in various forms by hardware only, software only, or a combination thereof (this similarly applies to FIG. 9 described later).

The present embodiment is described below by using, as an example, a case where an image from a third-person viewpoint is generated. Specifically, as in the example of FIG. 2, a case where an image from the viewpoint of the camera 19 is generated in order for the user B to watch the game play of the user A is described. It is assumed that the HMD 15 of the user A (player) and the image providing apparatus 21 are supplied with images of the same game play (game play of the user A) generated at respective viewpoints.

The captured image acquisition section 101 acquires a captured image of the real space. The captured image of the real space according to the present embodiment is acquired from the camera 19 via the HDMI transmission/reception section 106. The captured image acquisition section 101 supplies each of the acquired captured images to the player recognition section 102, the viewpoint acquisition section 103, and the superimposition block 112.

The player recognition section 102 recognizes the body of the player. Specifically, the player recognition section 102 recognizes the position and pose of each body part of the body of the player on the basis of the position and pose of each body part of the user A in the captured image acquired by the captured image acquisition section 101. For example, the player recognition section 102 recognizes the body of the player by estimating the position and pose of each part of the player with the use of a learned machine learning model on the basis of the image captured by the camera 19. For example, the player recognition section 102 can recognize the body of the player by using an open pose or the like. The player recognition section 102 supplies the result of the recognition to the skeleton generation section 104.

The viewpoint acquisition section 103 acquires viewpoint information including the viewpoint position and line-of-sight direction of the camera 19, on the basis of the captured image supplied from the camera 19 via the captured image acquisition section 101. The viewpoint acquisition section 103 supplies the acquired viewpoint information to the rendering block 111. The viewpoint information regarding the camera 19 is an example of viewpoint information regarding a spectator having a viewpoint different from a viewpoint of the player.

The skeleton generation section 104 generates a skeleton of the body of the player on the basis of the result of the recognition by the player recognition section 102. For example, the skeleton generation section 104 generates this skeleton by estimating the position and pose of each part of the skeleton of the player with the use of a learned machine learning model on the basis of the result of the recognition of the position and pose of each body part of the body of the player. For example, the skeleton generation section 104 can generate a skeleton by using open pose or the like.

Figure 4A:
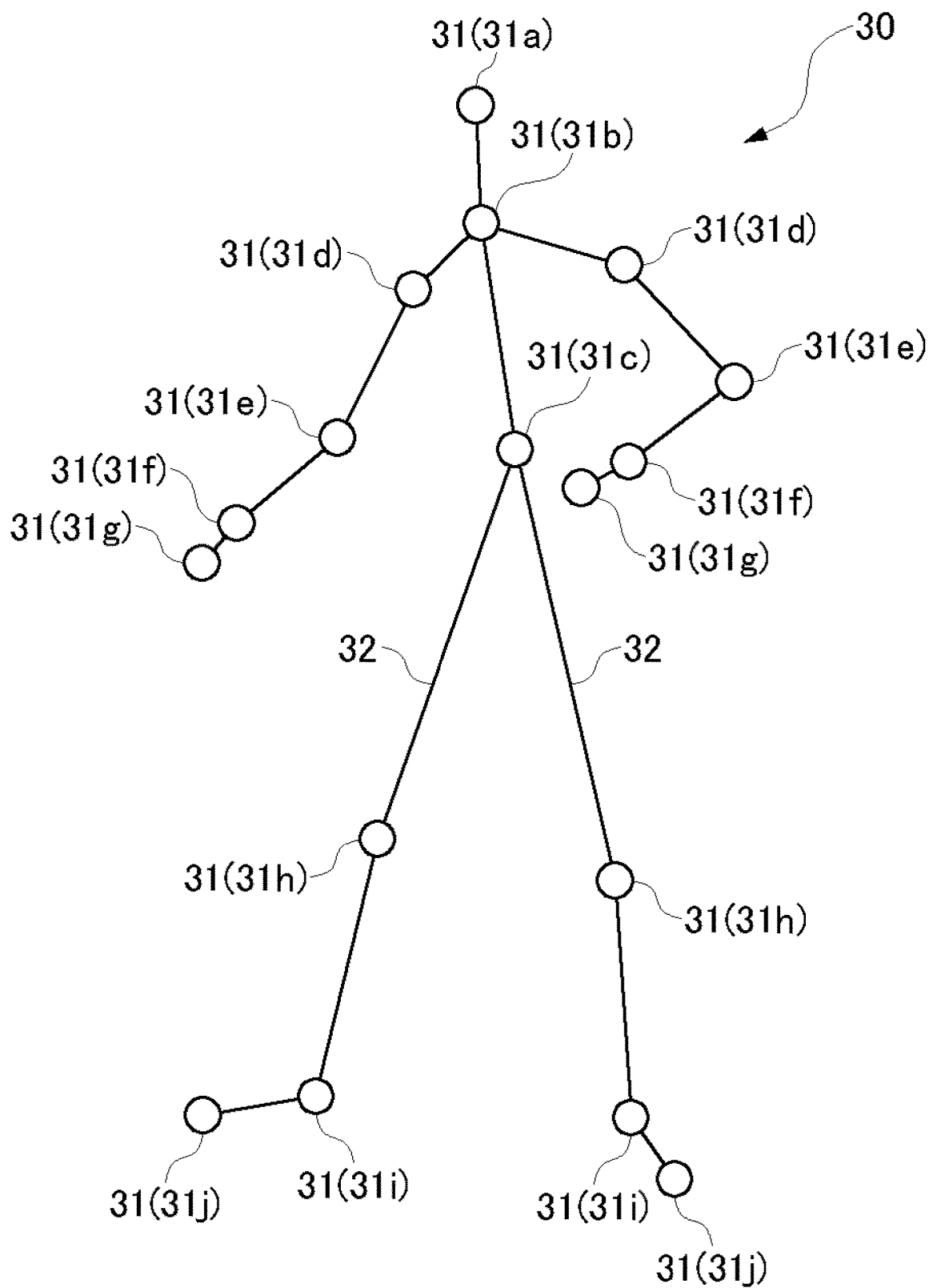
FIG. 4A is a view exemplifying a skeleton.
Figure 4B:
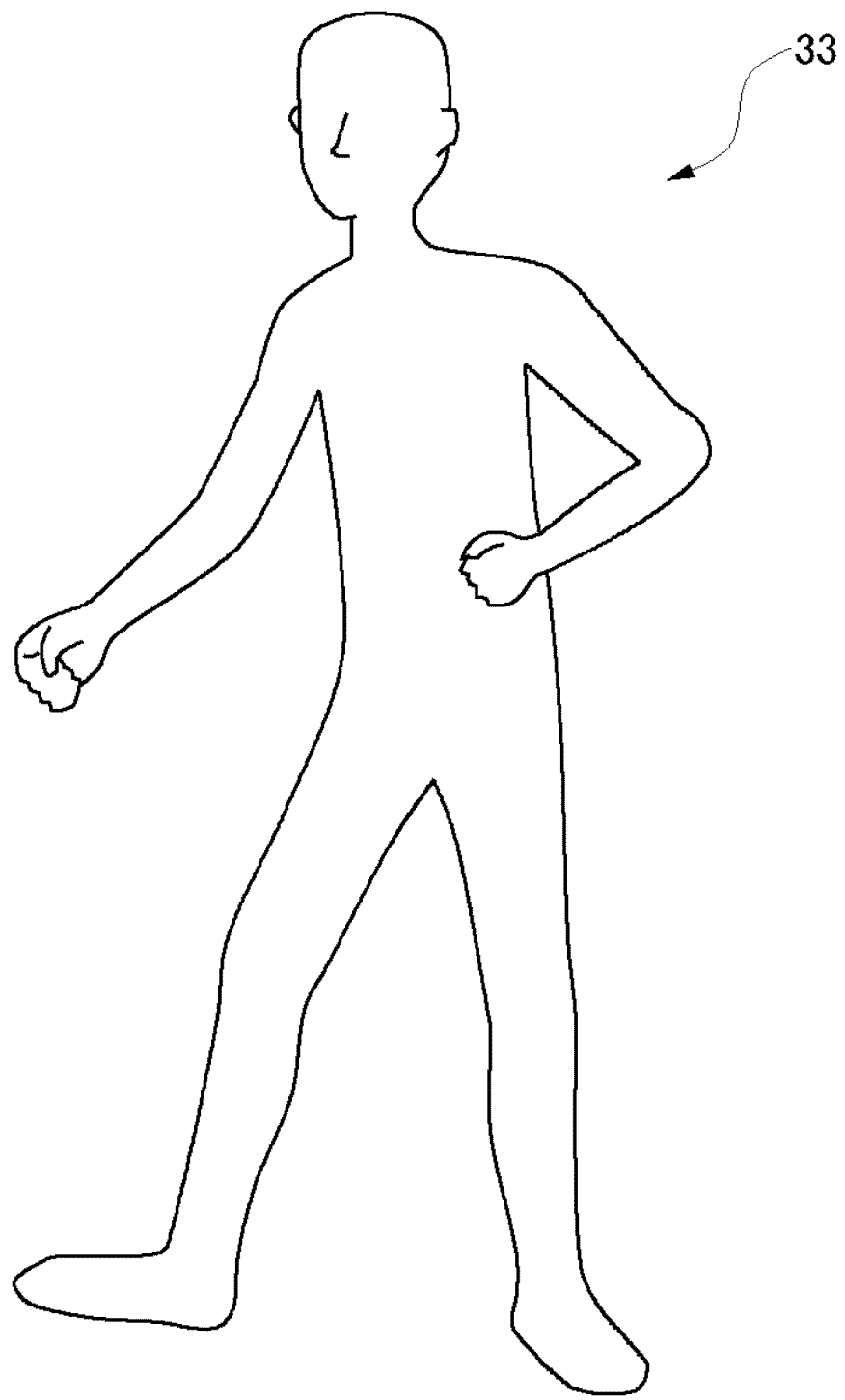
FIG. 4B is a view exemplifying a mesh structure.

FIG. 4A illustrates a skeleton generated by the skeleton generation section 104. The example of FIG. 4A illustrates a case where the user A is viewed from the viewpoint (front view) of the camera 19 of FIG. 2 (this similarly applies to FIGS. 4B and 4C below). A skeleton 30 of FIG. 4A includes a plurality of nodes 31 each representing an end or joint of the body of the player. Specifically, the skeleton 30 includes a head node 31a, a chest node 31b, a waist node 31c, shoulder nodes 31d, elbow nodes 31e, wrist nodes 31f, hand nodes 31g, knee nodes 31h, ankle nodes 31i, and foot nodes 31j of the player. Adjacent ones of the nodes 31 are connected to each other by bones 32. In the present embodiment, the skeleton generation section 104 generates the skeleton 30 by estimating the positions and poses relative to reference positions and poses (e.g., the initial positions and poses at the start of the game) of the individual nodes 31 corresponding to the body parts of the player. Data regarding the estimated position and pose of each node 31 is stored in the storage unit 12. Therefore, it is possible to accurately reflect a positional relation between the parts of the body of the player in a depth direction in the skeleton. The skeleton generation section 104 supplies the generated skeleton to the mesh generation section 105.

The mesh generation section 105 generates a mesh structure of the player that reflects the generated skeleton. For example, the mesh generation section 105 generates a mesh structure 33 of the player (see FIG. 4B) by modeling the skeleton with a mesh structure on the basis of the shape of the player in the acquired captured image in the real space. The mesh structure of the player is modeled by a known method. The mesh generation section 105 supplies the generated mesh structure of the player to the rendering block 111.

According to the viewpoint information regarding the camera 19, the rendering block 111 individually renders the mesh structure of the player and a virtual object when viewed from the viewpoint position of the viewpoint information in the line-of-sight direction. Specifically, the rendering block 111 renders the virtual object and stores a color value in a pixel buffer 121. Also, the rendering block 111 renders and renders the mesh structure of the player in, for example, white (RGB (255, 255, 255)) or gray (RGB (128, 128, 128)) and stores it in the pixel buffer 121. As a virtual object to be superimposed on the mesh structure of the player, the rendering block 111 renders a virtual object that can be attached to at least a part of the mesh structure of the player, such as the player's avatar, cloth, or accessory, for example.

When the rendering block 111 renders the mesh structure of the player, a depth value (mesh depth value) of the mesh structure of the player is written to a depth buffer (referred to as a "mesh depth buffer") 122 for the mesh structure of the player. If another virtual object is present in front of the mesh structure of the player, the mesh depth value is not written to that pixel in the mesh depth buffer 122, or the mesh depth value is overwritten and erased when another virtual object is rendered. As a result, a region for only a part in which the mesh structure of the player is drawn is generated.

When the rendering block 111 renders a virtual object, the depth value (scene depth value) of the virtual object is written to a depth buffer (referred to as a "scene depth buffer") 123 for virtual space rendering, and an anteroposterior relation between the virtual objects is determined. To a pixel where no virtual object is drawn, a specific depth value is not written in the scene depth buffer 123, and the scene depth value is infinite (undefined).

Moreover, the rendering block 111 renders a representation relating to light attributed to a virtual object that is to be superimposed on the mesh structure of the player. Examples of the representation relating to the light of the virtual object include a shadow cast by the virtual object on the mesh structure of the player, reflection of the virtual object on the mesh structure of the player, making the virtual object semi-transparent, and a representation of lighting onto the mesh structure of the player from a virtual light source. For example, shadow mapping can draw a shadow and reflection by a method such as projection of a depth map from a light source onto a plane or ray tracing. By superimposing a semi-transparent image of the shadow or reflection of the virtual object on the mesh structure of the user, the shadow or reflection of the virtual object on the mesh structure of the user can be represented. Since the mesh structure of the user is rendered in solid white, the mesh structure of the user can be distinguished from the region in which the shadow or reflection is drawn. In this way, a representation relating to light attributed to the virtual object superimposed on the mesh structure of the player is added to an image.

The rendering block 111 supplies the rendered mesh structure of the player and the rendered virtual object to the superimposition block 112.

The superimposition block 112 superimposes the captured image on the mesh structure of the player rendered by the rendering block 111. Specifically, the superimposition block 112 superimposes the captured image on a region in which the scene depth value is infinite and a region in which the mesh depth value is written. The captured image is superimposed on the region written in the mesh depth value while leaving the color information regarding the shadow of the virtual object and the lighting representation (such as reflection). The superimposition block 112 superimposes the virtual object on the mesh structure of the player on which the captured image is superimposed.

Figure 4C:
FIG. 4C is a view illustrating an example in which a virtual object is superimposed on the mesh structure of a player.

Refer to FIG. 4C. The superimposition block 112 generates an avatar 34 of the player by superimposing the virtual object of the avatar on the mesh structure of the player such that the virtual object of the avatar is pasted onto the mesh structure of the player. Here, in the example of FIG. 4C, the virtual object of the avatar is superimposed on the whole body of the player. However, the present disclosure is not limited thereto, and the virtual object may be superimposed on a part of the body of the player. In this case, the mesh structure of the player on which the captured image is superimposed can be viewed from portions other than the part on which the virtual object is superimposed.

The superimposition block 112 supplies the superimposed image to the post-processing block 113.

The post-processing block 113 performs a process for applying a representation relating to light attributed to the virtual object to the superimposed image. Further, the post-processing block 113 performs a process for applying a drawing effect corresponding to at least one of the position and pose of the mesh structure of the player. This drawing effect includes, for example, a motion blur corresponding to a change in the position of the mesh structure of the player, an aura rising from the mesh structure of the player according to the pose of the mesh structure of the player, and the like. In addition to these, the post-processing block 113 may perform post-processing such as depth-of-field adjustment, tone mapping, and anti-aliasing to make an image look natural and smooth. The post-processing block 113 supplies the post-processed image to the distortion processing block 114.

The distortion processing block 114 performs a process of deforming (distortion) and distorting the post-processed image according to the distortion caused by an optical system of the camera 19. The distortion processing block 114 supplies the image subjected to the distortion process to the HDMI transmission/reception section 106.

As described above, the image generation section 110 renders, for each of the users A and B, the mesh structure of the player and the virtual object when viewed in the viewpoint direction from the viewpoint position of a corresponding one of the users A and B. The image generation section 110 generates an image by superimposing the rendered virtual object on the rendered mesh structure.

The HDMI transmission/reception section 106 transmits the image generated by the image generation section 110 to the image providing apparatus 21 according to the HDMI. The image transmitted from the image generation apparatus 100 is displayed on the display of the image providing apparatus 21. Accordingly, the user B can view the image on which the virtual object is superimposed on the player. This image may be an AR image on which a video see-through image is superimposed as a background image of the player. Alternatively, this image may be a VR image on which a virtual object representing a virtual space is superimposed as a background image of the player.

Here, an image in which a virtual object is superimposed on an image of a player playing a game is described with reference to FIGS. 5 to 8.

Figure 5:
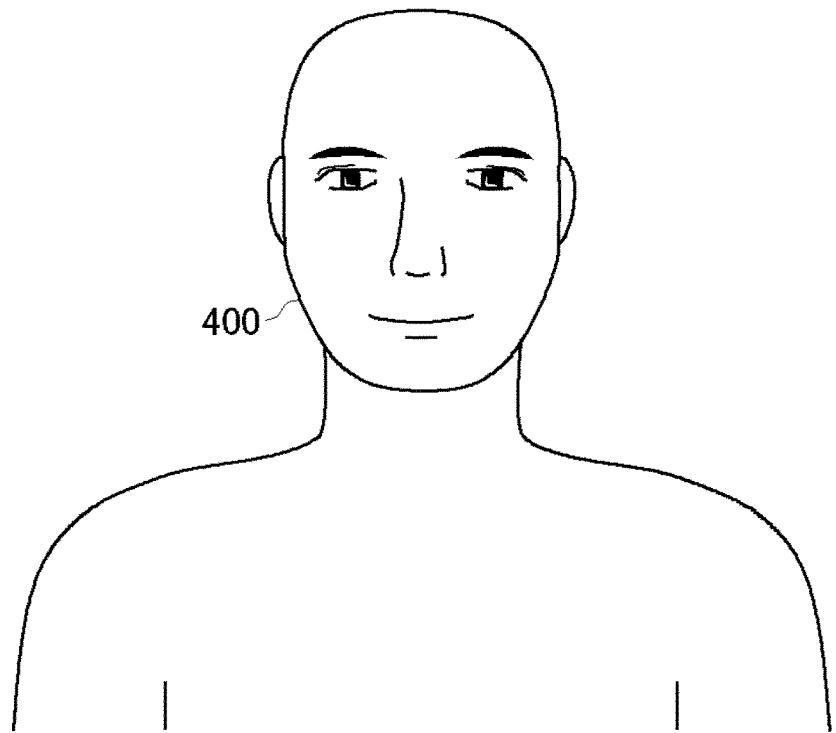
FIG. 5 is a view illustrating an example of a captured image.

FIG. 5 illustrates an example of an image captured by the camera 19. The captured image of FIG. 5 is an image of the user A playing the game which is captured by the camera 19. In the example of FIG. 5, the user A stands in front of the camera 19 by which a face 400 of the user A is mainly captured.

Figure 6:
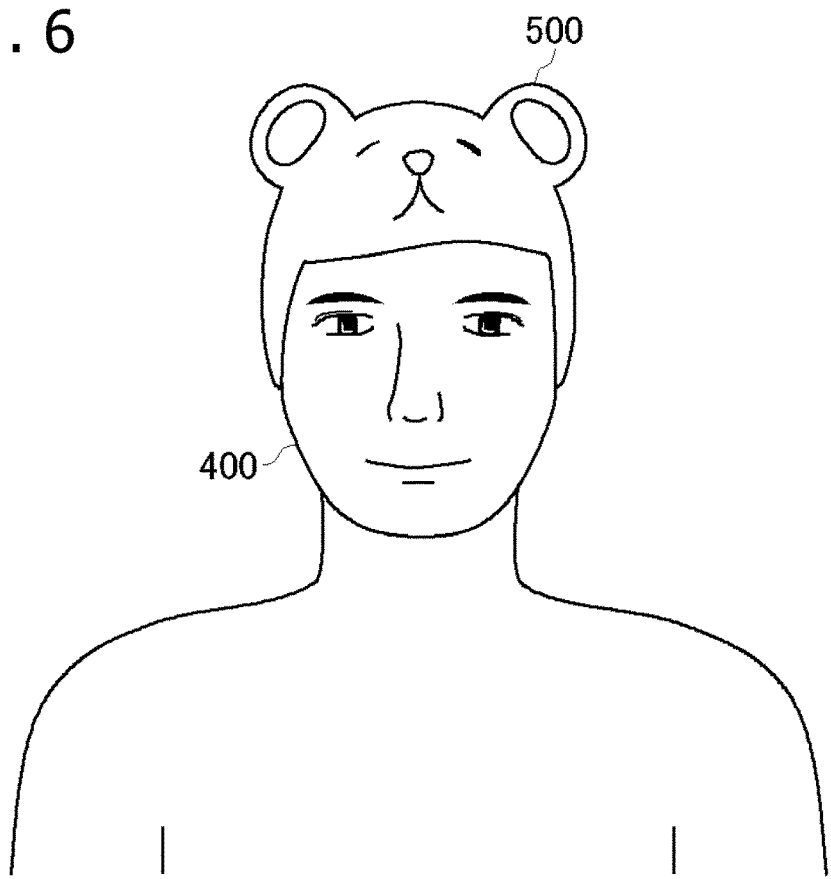
FIG. 6 is a view illustrating an example of an image in which a virtual object is superimposed on the captured image of FIG. 5.

FIG. 6 illustrates an example of an image in which a virtual object is superimposed on the captured image of FIG. 5. As illustrated in FIG. 6, a virtual object 500 of a bear headgear is superimposed on a part surrounding the face 400 of the user A. As a result, the user B can view, via the image providing apparatus 21, an image in which the virtual object 500 of the bear headgear is drawn around the face 400 of the user A.

Figure 7:
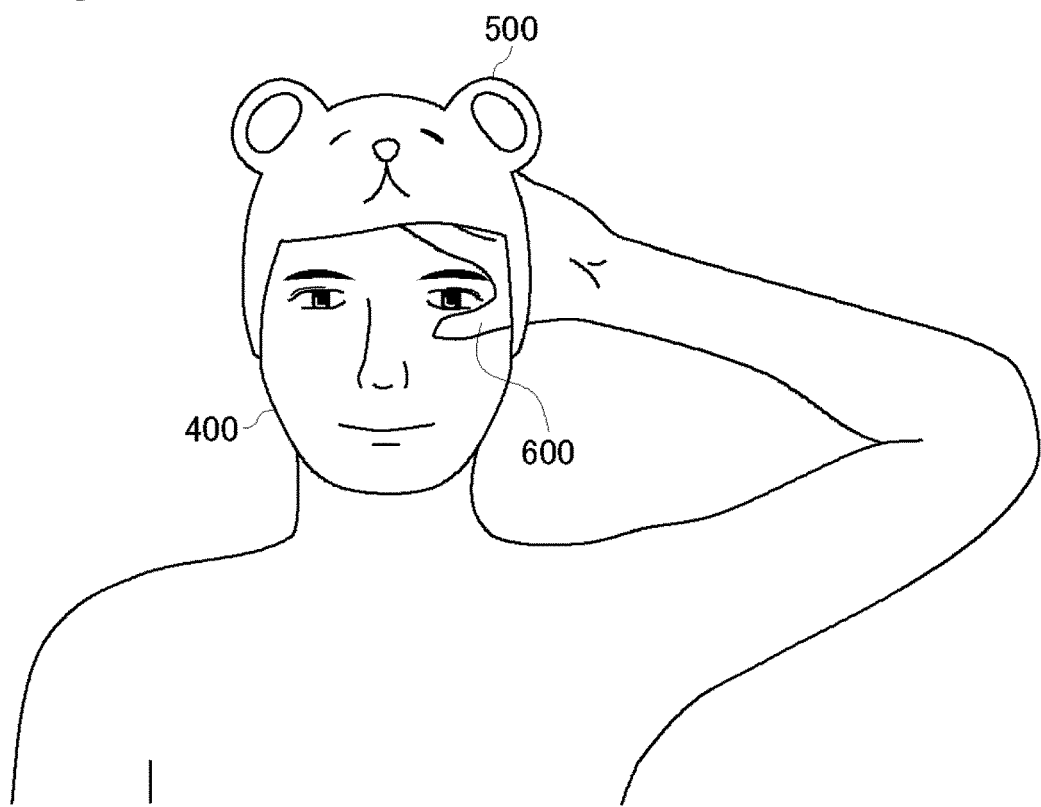
FIG. 7 is a view illustrating an example in which occlusion is represented by a conventional method.

FIG. 7 is a view illustrating an example in which occlusion is represented by a conventional method. For comparison, an example in which occlusion and depth are not appropriately represented is described with reference to FIG. 7. The example of FIG. 7 illustrates the user A trying to hide the face 400 with a hand 600. When the user A brings the hand 600 in front of the face 400 to hide the face 400 with the hand 600, the hand 600 appears at a position on the nearer side of the figure than the face 400 of the user A in the captured image. At this time, the virtual object 500 of the bear headgear, which is supposed to be on the far side of FIG. 7, is, in some cases, superimposed on a part of the hand 600 of the user A, which is supposed to be on the near side of FIG. 7. This is because, in some cases, the positional relation between the virtual object 500 of the bear headgear and a part of the hand 600 of the user A is not correctly determined. Accordingly, with the conventional method, inappropriate occlusion occurs in such a manner that a part of the hand 600 of the user A, which is supposed to be visible, becomes invisible by the virtual object 500 of the bear headgear. As a result, the depth is not appropriately represented, and a sense of unity between the body of the player and the virtual object cannot be obtained, resulting in an unnatural image. Therefore, it is necessary to correctly represent the positional relation between each part of the body of the player and the image superimposed on the player.

Figure 8:
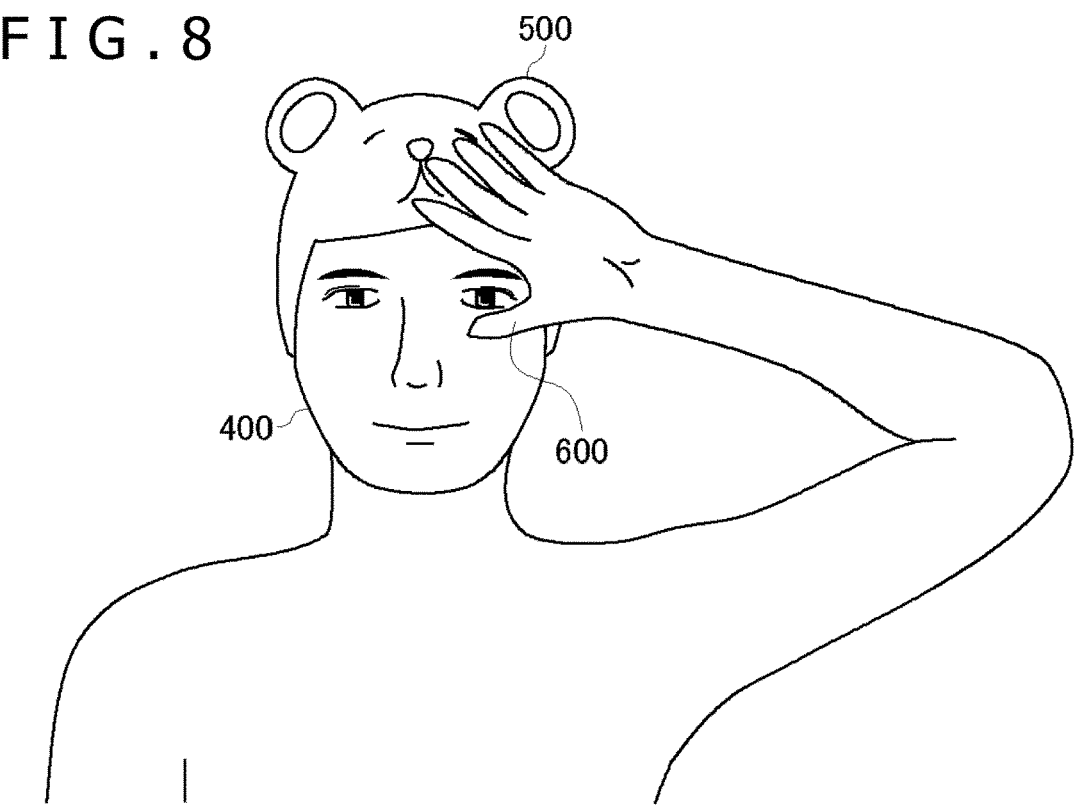
FIG. 8 is a view illustrating an example in which occlusion is represented by a method according to the first embodiment.

FIG. 8 is a view illustrating an example in which occlusion is represented by the method according to the present embodiment. The image generation apparatus 100 according to the present embodiment generates the mesh structure of the player that reflects the skeleton of the body of the player, and superimposes the virtual object on the mesh structure of the player. As described above, the skeleton accurately reflects the positional relation including the depth of each part of the body of the player. Therefore, according to the present embodiment, it is possible to more appropriately represent the occlusion between the body of the player and the virtual object superimposed on the mesh structure of the player. As a result, the depth is appropriately represented, and a sense of unity between the body of the player and the virtual object can be obtained, as a result of which a natural image can be provided.

In the present embodiment, the viewpoint information includes the viewpoint position and viewpoint direction of a spectator different from the player. This configuration makes it possible to provide the spectator with an image from a third-person (spectator) viewpoint in which the depth of the player is appropriately represented.

In the present embodiment, the image generation section 110 generates an image in such a manner as to add a representation relating to light attributed to the virtual object superimposed on the mesh structure of the player. Conventionally, it has not been possible to accurately reflect the representation relating to light attributed to the virtual object on the body of the player. With the present configuration, since the mesh structure of the player generated on the basis of the skeleton accurately reflects the positional relation of each part of the body of the player, it is possible to provide an image in which a representation relating to light attributed to the virtual object is more accurately reflected on the body of the player.

In the present embodiment, the image generation section 110 generates an image in such a manner as to add a drawing effect corresponding to at least one of the position and pose of the mesh structure of the player. With this configuration, since the mesh structure of the player appropriately reflects the positional relation of each part of the body of the player, it is possible to more appropriately represent a drawing effect such as a motion blur.

In the present embodiment, the captured image is superimposed on the mesh structure of the player, and the virtual object is superimposed on the mesh structure of the player on which the captured image is superimposed. Therefore, this configuration can make it possible to more accurately represent occlusion between a part of the body of the player on which the virtual object is superimposed and the other part of the body of the player that reflects the real appearance of the player.

Second Embodiment

A second embodiment of the present disclosure is described below. In the drawings and description of the embodiment below, the same reference signs are given to the same or equivalent constituent components and members as or to those in the first embodiment. The description overlapping with the description in the first embodiment is appropriately omitted, and the description focuses on configurations different from those in the first embodiment.

FIG. 9 is a configuration diagram of the image generation apparatus according to the second embodiment. The image generation apparatus 100 according to the present embodiment further includes a depth acquisition section 107 and a real space depth buffer 124. In the present embodiment, an AR image on which a video see-through image is superimposed as a background image of the player is provided.

The depth acquisition section 107 acquires depth information regarding the real space. The depth information regarding the real space according to the present embodiment is acquired from the camera 19. The depth information regarding the real space may be acquired by use of a depth sensor of such a system as an infrared pattern, structured light, or time of flight (TOF), for example. The depth acquisition section 107 supplies the acquired depth information to the mesh generation section 105.

The mesh generation section 105 according to the present embodiment generates the mesh structure of the real space including the mesh structure of the player. Specifically, the mesh generation section 105 generates the mesh structure of the real space by modeling the real space with the mesh structure on the basis of the depth information regarding the real space. The mesh structure of the real space is modeled by a known method. The mesh structure of the real space includes a wall, a floor, a ceiling, a stationary object, and the like in the real space.

The rendering block 111 renders the mesh structure of the real space in white (RGB (255, 255, 255)), for example, and stores it in the pixel buffer 121. When the rendering block 111 renders a real object, a depth value of the real object (referred to as a "real space depth value") is written to the real space depth buffer 124 for real space rendering. The real space depth value is used when an anteroposterior relation between real objects is determined. The real space depth value is generated on the basis of the depth information regarding the real space.

According to the present embodiment, it is possible to appropriately represent the positional relation of the mesh structure of the real space including the mesh structure of the player. As a result, it is possible to more appropriately represent the occlusion between the virtual object superimposed on the mesh structure of the player and an object (e.g., a ball or the like) that is present around the virtual object. As a result, the depth of the mesh structure of the real space can be represented more accurately.

Third Embodiment

A third embodiment of the present disclosure is described below.

Figure 10A:
FIG. 10A illustrates a mesh structure of a player on which a captured image of a real space is superimposed.
Figure 10B:
FIG. 10B is a view illustrating an example in which virtual objects of leg parts having a mechanical structure are superimposed on leg parts of the mesh structure of the player of FIG. 10A.

FIG. 10A illustrates a mesh structure of a player on which a captured image of a real space is superimposed. Here, a case where virtual objects (see FIG. 10B) of leg parts having a mechanical structure are superimposed on leg parts of the mesh structure of the player of FIG. 10A is described. As illustrated in FIG. 10B, in the case where the virtual objects of the leg parts having the mechanical structure which are to be superimposed are smaller than the leg parts of the mesh structure, the leg parts of the mesh structure, in some cases, come out of the virtual objects of the leg parts having the mechanical structure. In this case, it is likely that the leg parts of the mesh structure and the virtual objects of the leg parts having the mechanical structure do not fit with each other and become unnatural.

Therefore, in the case where a part of the mesh structure of the player on which a virtual object is superimposed comes out of the superimposed virtual object, the post-processing block 113 according to the present embodiment performs a process of distorting a space around the skeleton in this part such that the part on which the virtual object is superimposed does not come out of the virtual object. Here, the process of distorting the space is performed in at least one of a horizontal direction and a vertical direction. This process is described below with reference to FIGS. 10C and 10D.

Figure 10C:
FIG. 10C is a view illustrating an example of a process of distorting a space.

Refer to FIG. 10C. In the process of FIG. 10C, first, along the bones 32 connecting the waist node 31c, the knee nodes 31h, the ankle nodes 31i, and the foot nodes 31j of the skeleton to one another (see FIG. 4) in the leg parts of the mesh structure of the player, spaces therearound are distorted. In the present embodiment, a process of moving pixels in the spaces around the bones 32 toward the bones 32 is performed. The closer to the bones, the greater the amount of movement of the pixels. This makes it possible to make the leg parts of the mesh structure of the player thinner.

Figure 10D:
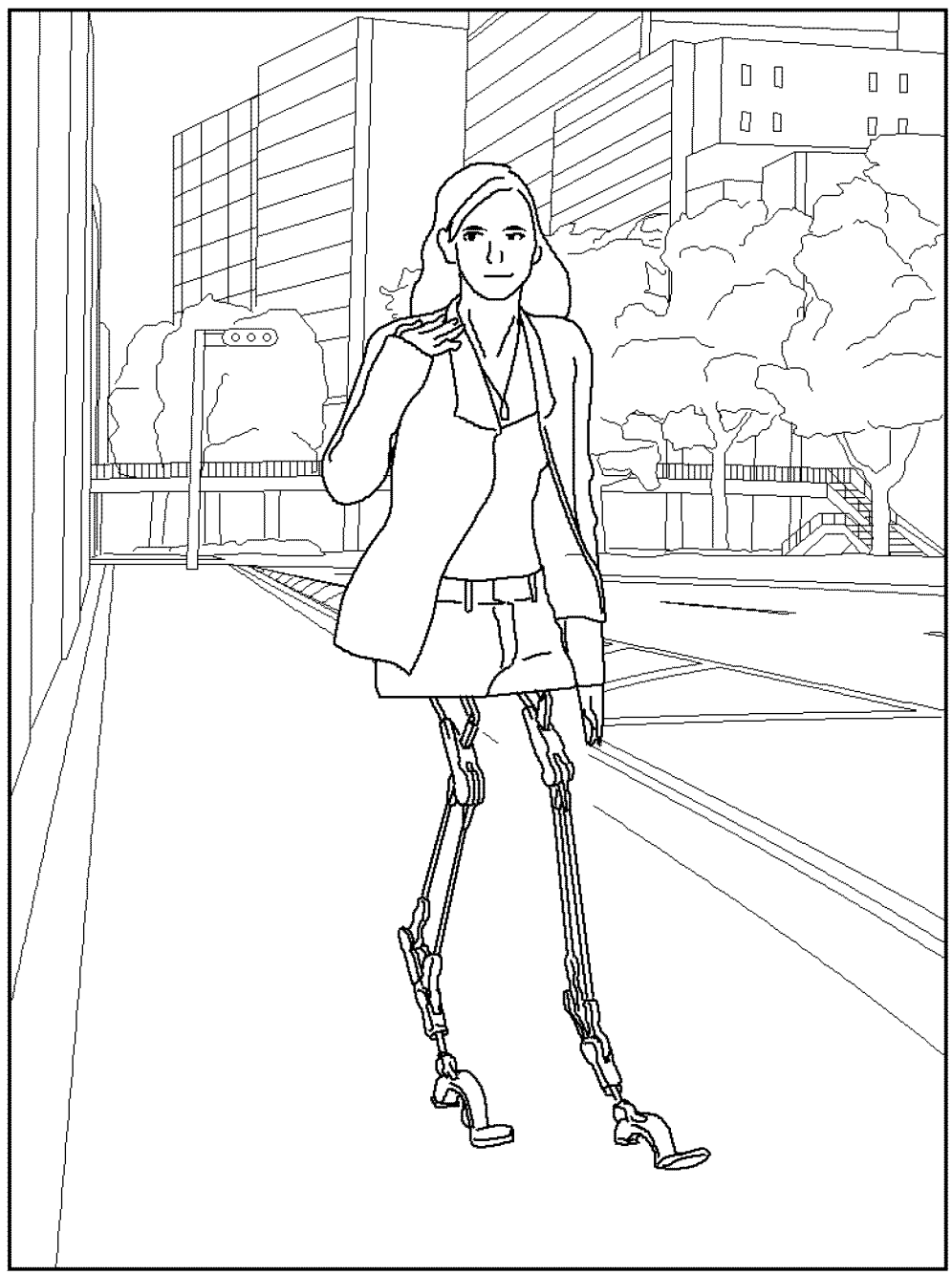
FIG. 10D is a view illustrating an example in which the virtual object is superimposed after the process of FIG. 10C.

Refer to FIG. 10D. The virtual objects of the leg parts having the mechanical structure are superimposed on the leg parts of the mesh structure of the player after the process described above. As illustrated in FIG. 10D, in the leg parts of the player, only the virtual objects of the leg parts having the mechanical structure become visible.

With this configuration, even in the case where a virtual object that is smaller than a part of the body of the player is superimposed, the virtual object can be fitted to the mesh structure of the player. Therefore, it is possible to suppress the generation of a feeling of strangeness caused by the difference between the size of the mesh structure of the player and the size of the virtual object.

Although the case where the mesh structure of the player comes out of the superimposed virtual object has been described by way of example in the present embodiment, the present disclosure is not limited thereto. For example, in the case where there is a significantly heavy object on top of a part (e.g., on top of the head) of the mesh structure of the player, the space around the part may be distorted to crush the part of the mesh structure of the player. Further, for example, in the case where an avatar itself of the player is set as a significantly heavy avatar (e.g., an avatar of an alien that looks like a giant rock or the like), the space in the vicinity of the floor on which the avatar is standing may be distorted. In this way, it is possible to make the mesh structure of the player appear smaller according to the characteristics of the virtual object.

<Modifications>

At least some of the functions of the image generation apparatus 100 may be implemented by the HMD 15 or the image providing apparatus 21. Alternatively, at least some of the functions of the image generation apparatus 100 may be implemented by a server connected to the image generation apparatus 100 via a network.

The image generation apparatus 100 may further be connected to a server via a network. In this case, the server may provide the image generation apparatus 100 with an online application such as a game in which a plurality of users can participate via the network. The HMD 15 or the image providing apparatus 21 may be connected to a computer or a mobile terminal instead of the image generation apparatus 100.

In the embodiments described above, the user A is a player playing the game, while the user B is a spectator watching the play of the user A in the game. However, the present disclosure is not limited thereto. For example, both of the users A and B may be players playing a game.

In the embodiments described above, the player recognition section 102 recognizes the body of the player on the basis of the captured image supplied from the camera 19. However, the present disclosure is not limited thereto. For example, the player recognition section 102 may use trackers to detect the positions and poses of body parts of the user and thus recognize the body of the player.

In the embodiments described above, the example in which the user A playing the game wears the HMD 15 has been described. However, the HMD 15 is not necessarily provided. In this case, for example, an image of the image generation apparatus 100 may be supplied to a display that is separately provided, and the user A only needs to play the game on the basis of the image displayed on this display.

In the embodiments described above, the example in which the camera 19 and the image providing apparatus 21 are used has been described. However, they are not necessarily used. In this case, for example, the user B may also wear the HMD 15, and an image captured by the HMD 15 of the user B may be supplied to the image generation apparatus 100 instead of an image captured by the camera 19. Then, an image generated by the image generation apparatus 100 on the basis of the viewpoint information regarding the HMD 15 only needs to be displayed on the HMD 15.

Although the camera 19 and the image providing apparatus 21 are separate bodies in the example of FIG. 2, they may be configured integrally. In this case, it is only necessary to use, for example, a personal computer or the like having an image-capturing function and a display function.

Although the captured image is superimposed on the virtual object of the player in the embodiments described above, only the virtual object may be superimposed on the mesh structure without superimposing the captured image.

Each process for the above-described representation relating to light, the above-described drawing effect, and the like in the post-processing block is not necessarily performed where appropriate.

Although such processes as the depth-of-field adjustment, the tone mapping, and the anti-aliasing are exemplified as post-processing in the description above, a distortion process, simple enlargement/reduction, trapezoidal transformation, and the like may also be called post-processing.

The present disclosure has been described above on the basis of the embodiments. The embodiments described above are for exemplary purposes only, and it is to be understood by those skilled in the art that various modifications can be made to combinations of the individual constituent components and individual processes of the embodiments and that such modifications also fall within the scope of the present disclosure.

INDUSTRIAL APPLICABILITY

The present disclosure relates to an image generation apparatus, an image generation method, and a program.

REFERENCE SIGNS LIST

10: Image generation system
15: HMD
100: Image generation apparatus
101: Captured image acquisition section
102: Player recognition section
103: Viewpoint acquisition section
104: Skeleton generation section
105: Mesh generation section
106: HDMI transmission/reception section
107: Depth acquisition section
110: Image generation section
111: Rendering block
112: Superimposition block
113: Post-processing block
114: Distortion processing block
121: Pixel buffer
122: Mesh depth buffer
123: Scene depth buffer
124: Real space depth buffer

The invention claimed is:

1. An image generation apparatus comprising:
a player recognition section configured to recognize a body of a player;
a viewpoint acquisition section configured to acquire viewpoint information including a viewpoint position and a viewpoint direction, wherein the viewpoint position and the viewpoint direction is of a spectator having a viewpoint different from a viewpoint of the player, wherein the player is a first user associated with the image generation apparatus and the spectator is a second user associated with the image generation apparatus;
a mesh generation section configured to generate a mesh structure of the player that reflects a skeleton of the body of the player on a basis of a result of the recognizing; and
an image generation section configured to generate an image by rendering the mesh structure of the player and a virtual object when viewed in the viewpoint direction from the viewpoint position in the viewpoint information, and pasting and superimposing the virtual object on the rendered mesh structure of the player.

2. The image generation apparatus according to claim 1, further comprising:
- a captured image acquisition section configured to acquire a captured image of a real space; and
- a depth acquisition section configured to acquire depth information regarding the real space,
- wherein the image generation section generates, on a basis of the captured image and the depth information, the image in such a manner as to represent occlusion between an object that is present in the real space and the virtual object superimposed on the mesh structure of the player.

3. The image generation apparatus according to claim 1, wherein the image generation section generates the image in such a manner as to add a drawing effect corresponding to at least one of a position and a pose of the mesh structure of the player.

4. The image generation apparatus according to claim 1, further comprising:
- a captured image acquisition section configured to acquire a captured image of a real space,
- wherein the image generation section generates the image by superimposing the captured image of the player on the mesh structure of the player and superimposing the virtual object on the mesh structure of the player on which the captured image is superimposed.

5. The image generation apparatus according to claim 1, wherein the image generation section generates the image in such a manner as to add a representation relating to light attributed to the virtual object superimposed on the mesh structure of the player.

6. The image generation apparatus according to claim 1, wherein the image generation section generates the image in such a manner as to represent occlusion between the body of the player and the virtual object superimposed on the mesh structure of the player.

7. The image generation apparatus according to claim 1, wherein the image generation section generates the image by distorting a space around the skeleton in a part of the mesh structure of the player on which the virtual object is superimposed.

8. The image generation apparatus according to claim 1, wherein, in a case where a part of the mesh structure of the player on which the virtual object is superimposed comes out of the superimposed virtual object, the image generation section generates the image by distorting a space around the skeleton in the part such that the part does not come out of the superimposed virtual object.

9. An image generation method comprising:
- recognizing a body of a player;
- acquiring viewpoint information regarding a viewpoint position and a viewpoint direction of a spectator having a viewpoint different from a viewpoint of the player, wherein the player is a first user and the spectator is a second user;
- generating a mesh structure of the player that reflects a skeleton of the body of the player on a basis of a result of the recognizing; and
- generating an image by rendering the mesh structure of the player and a virtual object when viewed in the viewpoint direction from the viewpoint position in the viewpoint information, and pasting and superimposing the virtual object on the rendered mesh structure of the player.

10. A system comprising:
- a processor; and
- a memory device including a program that is executable by the processor for causing the processor to perform operations comprising:
  - recognizing a body of a player;
  - acquiring viewpoint information regarding a viewpoint position and a viewpoint direction of a spectator having a viewpoint different from a viewpoint of the player, wherein the player is a first user and the spectator is a second user;
  - generating a mesh structure of the player that reflects a skeleton of the body of the player, on a basis of a result of the recognizing; and
  - generating an image by rendering the mesh structure of the player and a virtual object when viewed in the viewpoint direction from the viewpoint position in the viewpoint information, and pasting and superimposing the virtual object on the rendered mesh structure of the player.

* * * * *